United States Patent
Horner

(10) Patent No.: US 8,500,526 B2
(45) Date of Patent: Aug. 6, 2013

(54) VARIABLE SET POINT ALL-ELECTRIC PRESSURE RELIEF VALVE AND CONTROL, INDEPENDENT FROM THE AUTOMATIC CABIN PRESSURE CONTROL SYSTEM

(75) Inventor: Darrell Wayne Horner, Oro Valley, AZ (US)

(73) Assignee: Honeywell International, Inc, Armonk, NJ (US)

(*) Notice: Subject to any disclaimer, the term of this patent is extended or adjusted under 35 U.S.C. 154(b) by 1212 days.

(21) Appl. No.: 12/370,508

(22) Filed: Feb. 12, 2009

(65) Prior Publication Data

US 2010/0203819 A1  Aug. 12, 2010

(51) Int. Cl.
*B64D 13/00* (2006.01)
(52) U.S. Cl.
USPC .................................................. 454/76
(58) Field of Classification Search
USPC ............... 454/71, 72, 73, 74, 75, 76
See application file for complete search history.

(56) References Cited

U.S. PATENT DOCUMENTS

| | | | | |
|---|---|---|---|---|
| 2,846,934 | A | * | 8/1958 | Mauldin ........................ 454/73 |
| 4,164,899 | A | * | 8/1979 | Burgess ........................ 454/72 |
| 6,676,504 | B2 | | 1/2004 | Petri et al. |
| 6,945,278 | B2 | * | 9/2005 | Bunn et al. ................. 137/899.2 |
| 7,066,808 | B2 | * | 6/2006 | Whitney et al. ................. 454/70 |
| 2008/0233854 | A1 | | 9/2008 | Horner et al. |

FOREIGN PATENT DOCUMENTS

GB  882786  11/1961

* cited by examiner

*Primary Examiner* — Steven B McAllister
*Assistant Examiner* — Brittany E Towns
(74) *Attorney, Agent, or Firm* — Shimokaji & Associaates, PC

(57) ABSTRACT

A system for maintaining a desired cabin pressure in an aircraft includes a cabin-pressure control sub-system; a pressure relief valve for operation in event of failure or malfunction of the subsystem; a pressure relief valve actuator for operating the pressure relief valve; and a pressure relief valve control (PRVC) for producing commands for operation of the pressure relief valve actuator responsively to a first set of signal indicative of aircraft altitude and to presence of cabin-to-ambient pressure differential (ΔP) that varies from a desired ΔP by a predetermined amount.

9 Claims, 9 Drawing Sheets

VARIABLE SET POINT ALL-ELECTRIC PRESSURE RELIEF VALVE AND CONTROL, INDEPENDENT FROM THE AUTOMATIC CABIN PRESSURE CONTROL SYSTEM

BACKGROUND OF THE INVENTION

The present invention generally relates to pressure control in a cabin of an aircraft and, more particularly, provision of pressure relief which may be required maintain cabin pressure within safe limits.

In those aircraft that may operate at altitudes greater than about 8000 feet, passenger compartments or cabins are provided with controlled pressurization. Typically, pressurization may be controlled to maintain a cabin pressure that corresponds to that which would exist at about 6000 to 8000 feet above sea level. When an aircraft reaches an altitude in excess of 6000 to 8000 feet, a positive pressure differential may develop between an interior of the cabin and an exterior of the cabin. In the case of an aircraft at 45,000 feet, for example, this pressure differential may be as large as 10 pounds per square inch differential (PSID). This situation where the cabin interior pressure is greater than the exterior, ambient, pressure is defined as a positive differential pressure. It is also possible to operate the aircraft whereby the exterior pressure can exceed the interior pressure. This situation is defined as a negative differential pressure condition. Aircraft with pressurized cabins are designed with sufficient fuselage structural strength to withstand forces that may be generated by these anticipated pressure differentials. However, if an aircraft fuselage is exposed to a pressure differential in excess of the anticipated differential, there is a risk of overstressing the fuselage and, in an extreme case; there is even a risk of structural failure of the fuselage.

Fuselage structural strength is usually designed to withstand positive differential pressure magnitudes between 6 to 10 PSID, depending on the flight altitudes the airplane is designed to achieve. However, the fuselage structural strength is usually only designed to withstand negative differential pressures up to magnitudes around −0.25 PSID. Excess positive or negative pressure differential may occur if there is a malfunction or failure of a cabin pressure control system. In order to mitigate such a risk, all modern day aircraft are provided with an independent pressure relief valve which may operate to rapidly limit and regulate an excess pressure differential that may arise as a result of a failure of the cabin pressure control system. Additionally, certification regulations require pressure relief valves that automatically limit the positive and negative pressure between the inside and the outside of the fuselage structure. Some aircraft have pressure relief valves that perform both the positive and negative pressure relief function using the same valve. However, some aircraft utilize two different types of valve designs to perform the positive versus the negative pressure relief functions. This use of two different valve designs is often the case for aircraft types that are large in size, as the negative pressure relief valve size can become significantly larger than the positive pressure relief valve size, causing the weight of a combined positive and negative pressure relief valve to be too great for effective use on an airplane.

A typical prior art pressure relief valve may be set to operate when cabin-to-ambient pressure differential (hereinafter $\Delta P$) exceeds a single predetermined limit. The predetermined limit may be established for a particular aircraft design to meet regulatory safety requirements for an expected maximum operating altitude. In order for the relief valve to meet its required protective functionality, the valve must be provided with a sensing system that is independent from the aircraft cabin pressure control system so that a failure of the cabin pressure control system will not result in a failure of the relief valve. Also, a typical prior art positive pressure relief valve may a have sensing system and a valve actuating system that is all pneumatic. If a dedicated negative pressure relief valve is used on the airplane, its design may rely on a mechanical spring to shut a valve plate until the pressure difference across the valve plate exceeds the spring force. Then the negative pressure relief valve opens to ingress air to the interior of the airplane.

A typical prior art pneumatically controlled pressure relief valve utilizes the difference between the cabin and the atmosphere air to provide motive force for actuation. When the airplane is on the ground during normal taxi and gate operations, the $\Delta P$ across the fuselage is inadequate for the pressure relief valve to actuate from the closed position. Because an independent pressure relief valve is required to meet regulatory safety requirements, and because the pressure relief valve is only operated for its function after there is a failure of the automated outflow control system, the health status of pressure relief valve functionality must be periodically verified during maintenance checks of the airplane to verify that there is not a latent defect. Maintenance checks for pneumatically actuated valves must be performed either during a flight test, or by pressurizing the airplane on the ground, or by actuating the pressure relief valve using special pneumatic test equipment. A pneumatically actuated negative pressure relief valve is only ever actuated when a negative overpressure is experienced. Thus this valve type may also have a latent defect that would only be discovered during a maintenance check.

Another aspect of safely controlling the cabin pressure control function is that the cabin altitude must always be limited to ensure passenger safety. Aircraft certification regulations require that the cabin altitude be limited to less than 15,000 ft for most failure conditions. Thus, it is possible for a pressure relief valve, if it were to erroneously open fully during flight, to allow a cabin decompression beyond 15,000 ft in some circumstances. Existing art pneumatic pressure relief valves have some design techniques that prevent their opening during most failure conditions. However, there are still other pressure relief valve failure modes that would allow a complete opening of the pressure relief valve in flight to allow a decompression beyond 15,000 ft.

Some commercial aircraft may be operated in high-cycle modes. In other words, some aircraft may be employed in relatively short flights that reach only limited altitudes such as 35,000 feet. These short flights operations may result in a relatively high number of take-offs and landings along with a high number of cabin pressurization cycles. Increased longevity of a high-cycle aircraft could be achieved if potential $\Delta P$ were not allowed to rise as high as that which might develop at a high altitude such as 45,000 feet. But, in the event of a failure of the automated outflow control system, a relief valve set for operation at a 45,000 ft. operating altitude may potentially permit $\Delta P$ to rise to 10 PSID, even if an aircraft operates only at 35,000 feet. Consequently, regulatory safety requirements for aircraft structure mandate that each cycle of aircraft operation is deemed to have produced fuselage stress at a level that would have occurred during operation. These regulations provide limits on the number of cabin pressurization cycles that may be allowed between maintenance intervals or before retirement of an aircraft. The regulatory requirements take into account the reality that the aircraft may have operated only at a low altitude and experienced cabin pressurization substantially lower than the set point of the relief valve, but they also consider that the automated outflow control system may have failed and that some of the operating flight cycles may have experienced a ΔP equivalent to the pressure relief valve set for operation at 45,000 ft altitude. Therefore the regulatory requirements may reduce the quantity of cycles that a high-cycle aircraft may achieve.

It must be noted that high-cycle aircraft may occasionally operate at high altitudes such as 45,000 feet. Thus, a pressure relief valve with a set point for airplane operation only to 35,000 ft would prevent normal automated outflow valve control operation up to 45,000 ft. In those circumstances, cabin pressurization may indeed rise as high as 10 PSID. Consequently, a relief valve with a single set point must be set to operate at a pressure no less than 10 PSID. Otherwise, if the relief valve were set to operate at a lower differential pressure, proper cabin pressurization could not be attained for the occasional high altitude flight.

Some commercial aircraft are designed to optimize structural weight by limiting combinations of pressure loads and fuselage loads caused by in-flight aerodynamic maneuvering loads. It is possible that due to increased air density at flight altitudes less than, for example, 10,000 ft, that aerodynamic maneuvering loads may be higher than those loads developed by similar maneuvers at much higher altitudes. Thus, when considering airplane structural weight, it would be advantageous to reduce the pressure loading due to ΔP for altitudes less than 10,000 ft when the aerodynamically induced maneuver loads are at their greatest.

As can be seen, it would be desirable to provide a cabin pressure relief system that takes into account the actual operating altitude of an aircraft and has have a ΔP limiting and regulating function that is independent from the rest of the cabin pressure outflow control system. Additionally, it would be desirable to construct pressure relief valves with the means to automatically perform periodic functional checks without maintenance crew interaction. It would also be advantageous to combine the positive and negative pressure relief valve functions into a single pressure relief valve. Also, it would be an advantage that a pressure relief valve has means to prevent it from opening and causing a decompression beyond 15,000 ft.

SUMMARY OF THE INVENTION

In one aspect of the present invention, a system for maintaining a desired cabin pressure in an aircraft comprises a cabin-pressure control sub-system; a pressure relief valve for operation in event of failure or malfunction of the subsystem; a pressure relief valve actuator for operating the pressure relief valve; and a pressure relief valve control (PRVC) for producing commands for operation of the pressure relief valve actuator responsively to a first set of signal indicative of aircraft altitude and to presence of cabin-to-ambient pressure differential (ΔP) that varies from a desired ΔP by a predetermined amount In another aspect of the present invention, a cabin pressure relief system for an aircraft comprises a pressure relief valve with a closure member; an actuator for the closure member; a function generator programmed with a desired parametric relationship among parameters: aircraft altitude; desired cabin-to-ambient pressure differential (desired ΔP); and a predetermined limit of variation between desired ΔP and actual cabin-to-ambient pressure differential (actual ΔP); the function generator adapted to produce cabin-to-ambient pressure differential (ΔP) command signals based on a state of the parameters; and the actuator being adapted to rotate responsively to the ΔP command signals and actual ΔP to open the closure member of the pressure relief valve so that excessive variations between actual ΔP and desired ΔP are reduced.

In a still another aspect of the invention, a method for controlling cabin pressure and ΔP in an aircraft comprises the steps of: controlling cabin pressure with an auto-controller; sensing altitude of the aircraft independently of the controlling step; determining actual ΔP in the aircraft independently of the controlling step; producing a error signal that is a function of both the independently sensed altitude and the independently sensed actual ΔP; and opening a relief valve responsively to a non-zero value of the ΔP error signal.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention provide an aircraft cabin pressure relief system that functions responsively to variable pressure differential set points. In particular embodiments of the present invention, the set points may be dynamically established as a function of altitude at which an aircraft may be operating.

Figure 1:
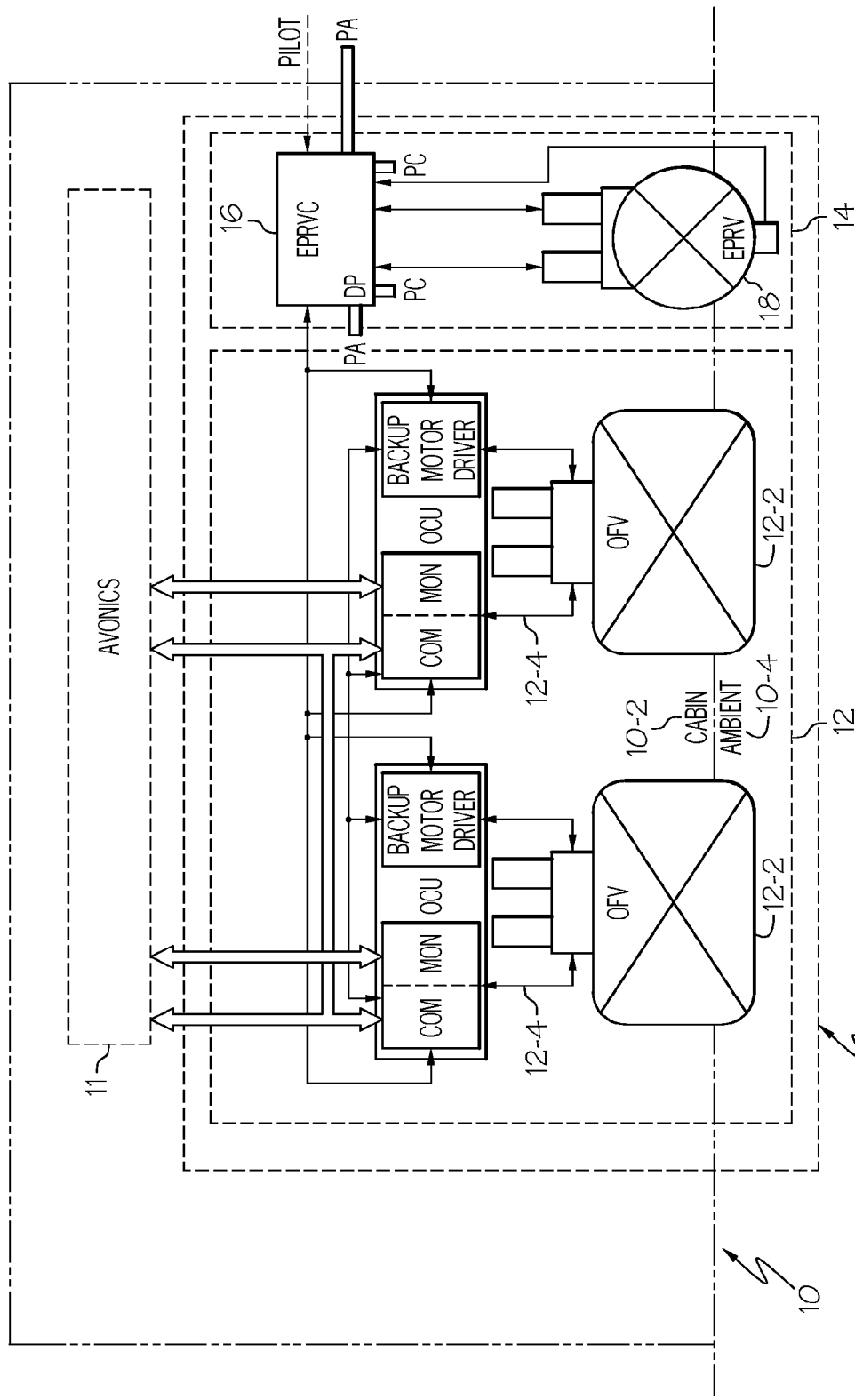
FIG. 1 is a block diagram of an aircraft cabin pressure control and relief system in accordance with an embodiment of the present invention.

Referring now to FIG. 1, a block diagram illustrates an aircraft 10 with an entire cabin pressure control system 13, comprised of a cabin pressure outflow valve control sub-system 12 that for controlling outflow valves 12-2 to achieve normal cabin pressure control, and a cabin pressure relief sub-system 14. The cabin pressure outflow valve control sub-system 12 may maintain a desired pressure in a cabin of the aircraft 10 through control signals 12-4 in a conventional manner. For example, the sub-system 12 may be constructed and operated as an auto-controller with outflow valve in accordance with a description set forth in published Patent Application US 2008/0233854 A1 which is incorporated by reference herein. During routine operation of the aircraft 10, the sub-system 12 may maintain air pressure in a cabin at a level that is high enough to be comfortable for passengers. At the same time cabin pressure may be controlled low enough to preclude excessive pressure differential between a cabin or interior 10-2 and ambient or exterior 10-4 of the aircraft 10. For safety purposes the cabin pressure relief sub-system 14 may rapidly release air from the aircraft 10, to limit and regulate the ΔP, in the event of a malfunction or failure of the cabin pressure outflow valve control sub-system 12. Therefore, the cabin pressure relief sub-system 14 is designed to be independent from the outflow valve control sub-system 12, such that any part of the outflow valve control sub-system 12 could fail—including its interfaces with aircraft 10, avionics 11, electrical power inputs, or any other aircraft 10 system—will not affect the proper operation of the pressure relief sub-system 14. This independence includes mechanical, electrical, and software design aspects.

Figure 2:
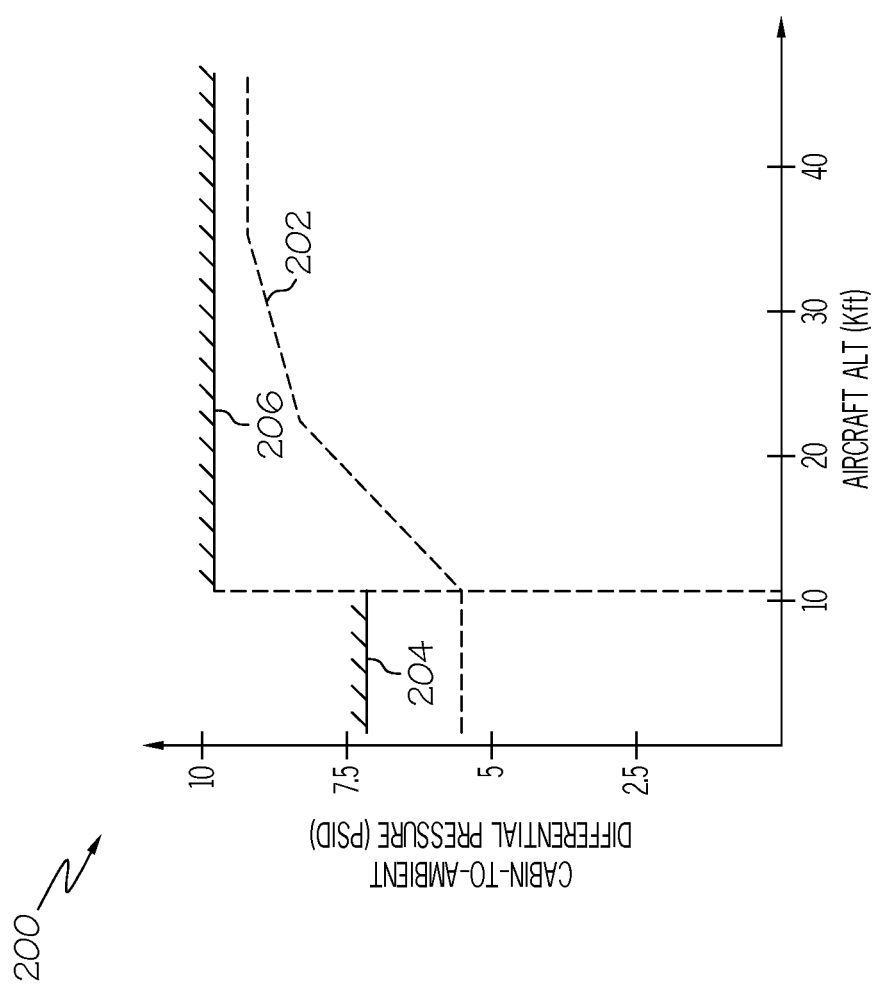
FIG. 2 is a graphical step-function representation of a parametrical relationship between a desired ΔP and relief valve limits in accordance with an embodiment of the present invention.

Referring now to FIG. 2, a graph 200 may portray a relationship between altitude of the aircraft 10 and ΔP. A graph line 202 may represent desired cabin-to-ambient pressure differential (hereinafter desired ΔP 202) in the aircraft 10 as maintained by the cabin pressure outflow valve control sub-system 12. A graph line 204 may represent a first set point for the cabin pressure relief sub-system 14 at altitudes up to 10,000 feet. A graph line 206 may represent a second set point for the cabin pressure relief sub-system 14 at altitudes above 10,000 feet.

Figure 3:
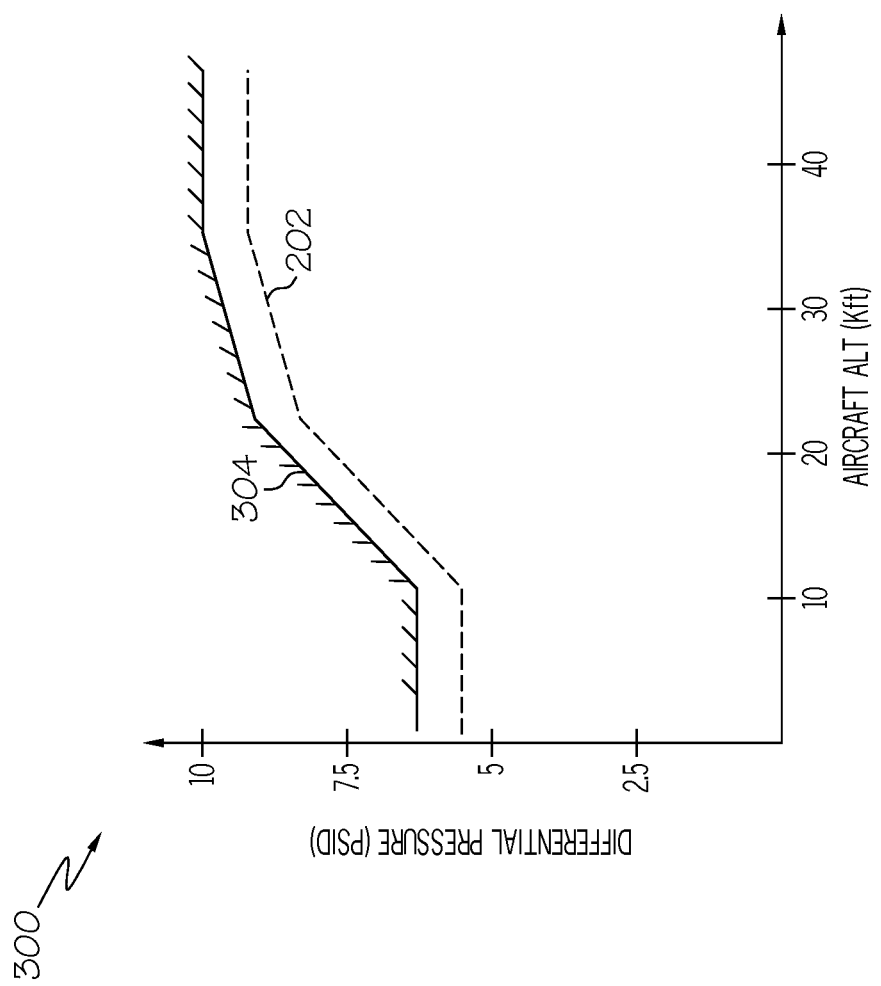
FIG. 3 is a graphical representation of a continuous parametrical relationship between a desired ΔP and relief valve limits in accordance with an embodiment of the present invention.

Referring now to FIG. 3, a graph 300 may portray a more complex relationship between altitude of the aircraft 10 and ΔP. Graph line 202 may represent desired ΔP in the aircraft 10 as maintained by the cabin pressure outflow valve control sub-system 12. A graph line 304 may represent a series of set points for the cabin pressure relief sub-system 14 at various altitudes. It may be noted that the graph lines 202 and 304 may be substantially parallel to one another. In that regard a relationship between the graph line 202 and 304 may be considered to be a representation of a predetermined amount of variation of ΔP that may be tolerated before operation of the pressure relief sub-system 14

It may be readily recognized that, as compared to high altitude flight, a fuselage of the aircraft 10 may experience lower pressure induced stress at altitudes of 35,000 feet or lower. Consequently, the aircraft 10 equipped with the pressure relief system embodiment of the present invention may be safely operated for an increased number of cycles at altitudes of 35,000 feet or less. In other words, there may be no need to make a regulatory presumption that the aircraft was exposed to ΔP of 10 PSID, when in fact the cabin pressure relief sub-system 14 may have potential ΔP limited to that according to that experienced at lower altitudes.

Figure 4:
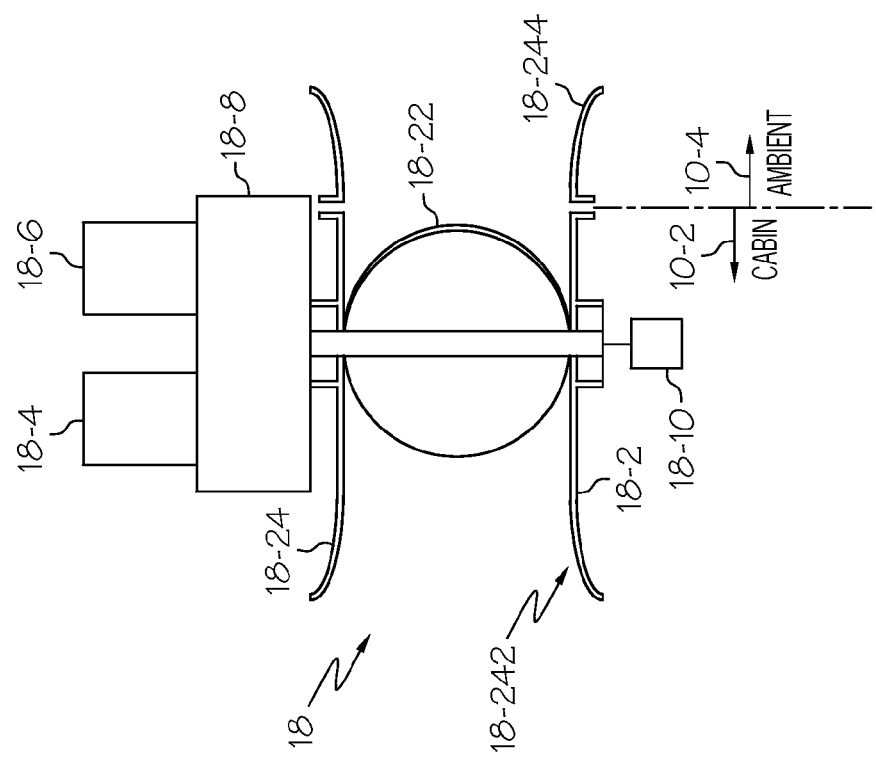
FIG. 4 is a cross-sectional view of a dual-actuator pressure relief valve in accordance with an embodiment of the present invention.

Referring to FIG. 4 and back to FIG. 1 it may be seen how the cabin pressure relief sub-system 14 may provide desired variation in its operational set points. The sub-system 14 may comprise a pressure relief valve control unit (PRVC) 16 and a relief valve assembly 18. As shown in detail on FIG. 4, the relief valve assembly 18 may comprise a relief valve 18-2, one or more valve actuators 18-4 and/or 18-6, a gearbox 18-8 and an end-of-travel sensor 18-10. In an exemplary embodiment of the present invention the relief valve 18-2 may comprise a butterfly valve plate 18-22 and a valve body 18-24 with bell-shaped openings 18-242 and 18-244. The bell-shaped openings 18-42 and 18-244 may be used to more slowly accelerate air flowing into or out of the aircraft 10 when the valve 18 is open, thus improving aerodynamic efficiency of the valve 18-2. As compared to a valve without the bell-shaped openings 18-242 and 18-244, the valve 18-2 may have a valve body 18-24 with a smaller diameter. Consequently, the pressure relief valve 18-2 may have less weight. Furthermore, structural mounting interface stress for the pressure relief valve 18-2 may be reduced.

The actuators 18-4 and/or 18-6 may be electric motors. In an exemplary embodiment, the actuators 18-4 and/or 18-6 may be brushed direct current (DC) motors which may operate responsively to pulse-width modulated (PWM) signaling. In the configuration shown in FIG. 4, the actuator 18-4 may be a primary actuator and the actuator 18-6 may be a secondary actuator. The gearbox 18-8 may transmit torque from either or both of the actuators 18-4 and/or 18-6 to the butterfly valve plate 18-22.

Figure 5:
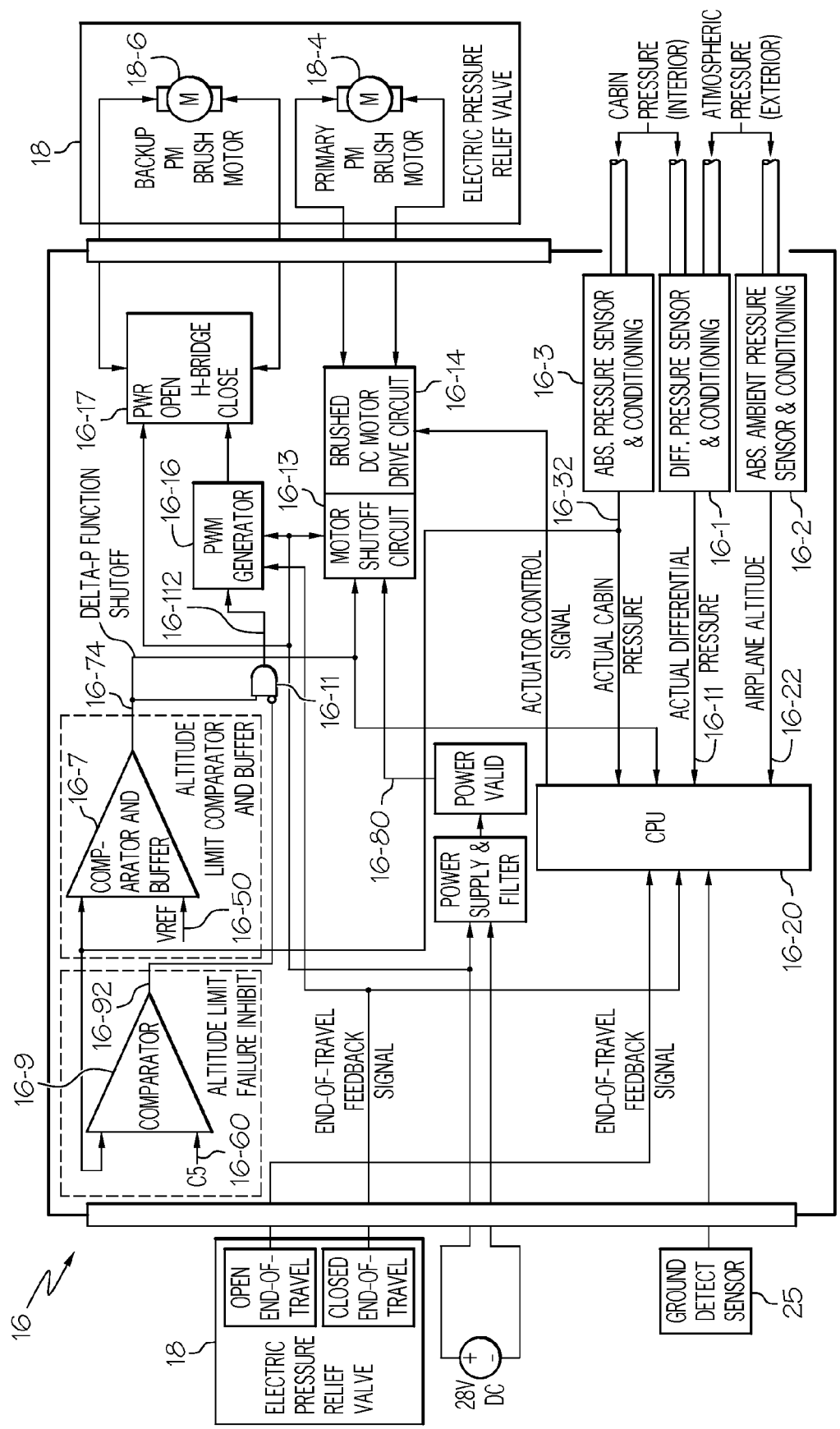
FIG. 5 is a detailed block diagram of a pressure relief system with dual actuators in accordance with an embodiment of the present invention.

Referring to FIG. 5, in an exemplary embodiment, the PRVC 16 may be provided with three pressure sensors 16-1, 16-2, and 16-3 that each may produce a signal representative of the parameter that is being sensed. Pressure sensor 16-1 may be a differential pressure sensor that may be in communication with the interior 10-2 to sense cabin pressure and in communication with the exterior 10-1 to sense ambient pressure. Pressure sensor 16-1 may produce a signal 16-11 representative of a difference between the cabin pressure and the ambient pressure. Ambient pressure sensor 16-2 may be an absolute pressure sensor that is in communication with the exterior 10-1 to sense ambient pressure. Ambient pressure sensor 16-2 may produce a signal 16-22 that may be representative of the ambient pressure. Cabin pressure sensor 16-3 may be an absolute pressure sensor that may be in communication with the interior 10-2 to sense cabin pressure. Cabin pressure sensor 16-3 may produce a signal 16-32 that may representative of the cabin pressure. The differential pressure sensor 16-1 may produce the signal 16-11 independently from the ambient pressure sensor 16-2 and the cabin pressure sensor 16-3 so that possible malfunction of the ambient pressure sensor 16-2 and/or the cabin pressure sensor 16-3 may not affect proper functioning of the differential pressure signal 16-1 and production of the signal 16-11. Likewise, the differential pressure sensor 16-1 may produce the signal 16-11 independently from signals used to create similar information within the outflow valve control sub-system 12 of FIG. 1, so that failure of any input or part of the outflow valve control sub-system 12 may not affect proper functioning of the differential pressure sensor 16-1 and production of the signal 16-11.

The PRVC 16 may be provided with a reference signal 16-50 that may represent hypothetical cabin pressure at an aircraft altitude of 15,000 ft. The PRVC 16 may also be provided with a reference signal 16-60 that may represent a hypothetical pressure at which that the cabin pressure signal 16-32 may out of valid range (e.g., a voltage representative of a level of the cabin pressure signal 16-32 that may not be reached unless there is a failure to the cabin pressure sensor 16-3). A comparator 16-7 may compare the actual cabin pressure signal 16-32 to the reference signal 16-50 to determine if the actual cabin pressure has decompressed to an altitude above 15,000 ft or not. An output of the comparator 16-7 may a signal 16-74 that may a Boolean true or false signal, where the Boolean true signal 16-74 may indicate that the cabin pressure has decompressed beyond 15,000 ft. The Boolean true signal 16-74 may identified as the altitude limit signal 16-74.

The PRVC 16 may also be provided with a primary motor shutoff circuit 16-13 and a primary motor drive circuit 16-14. The primary motor shutoff circuit 16-13 may contain a function that disables the ability of the primary motor driver circuit 16-14 when the altitude limit signal 16-74 is present. It can also be understood that the primary motor shutoff circuit 16-13 may be provided with other inputs that might also lead to a disablement of the primary motor driver circuit 16-14, such as an invalid power input 16-80.

A comparator 16-9 may compare the actual cabin pressure signal 16-32 to a reference signal 16-60 to indicate whether the cabin pressure signal 16-32 is a valid cabin pressure signal. An output signal 16-92 of a comparator 16-9 may be a Boolean true or false signal 16-92 The Boolean signal 16-92 may indicate if the cabin pressure signal 16-32 is invalid. A true Boolean signal 16-92 may be identified as an invalid cabin pressure signal 16-92. An inverting input AND gate 16-11 may be provided with inputs from the invalid pressure signal 16-92 and the altitude limit signal 16-74. The invalid pressure signal 16-92 may go to an inverting input of the gate 16-11, while the altitude limit signal 16-74 may go to a normal input of the gate 16-11. An output signal 16-112 of the gate 16-11, may indicate a validated altitude limit condition. The output signal 16-112 of the gate 16-11 may be identified as a validated altitude limit signal 16-112.

The PRVC 16 may also contain a PWM generator circuit 16-16 and a backup motor driver H-Bridge circuit 16-17 of a configuration known to one experienced in the art. The PWM generator circuit 16-16 may be connected to a close winding control of the backup motor driver H-Bridge circuit 16-17, so that when the PWM generator circuit 16-16 may receive the validated altitude limit signal 16-112, then the PWM generator circuit 16-16 may apply a PWM signal to the close winding control of the backup motor driver H-Bridge circuit 16-17.

Thus, it may be seen that if cabin pressure is detected to be decompressed above a cabin altitude of 15,000 ft, the altitude limit signal 16-74 may disable the primary motor driver circuit 16-14 using the primary motor shutoff circuit 16-13 so that the primary actuator 18-4 may no longer operate the valve 18. Further, it may be seen that if the validated altitude limit signal 16-112 is received by PWM generator 16-16, then the backup motor driver H-Bridge circuit 16-17 may close valve 18 using actuator 18-6. In this way it can be seen that valve 18, when coupled to the PRVC 16 may not cause a decompression of the aircraft 10 due to an erroneous open command to the valve 18 that may result from improper control of the actuator 18-4.

Figure 6:
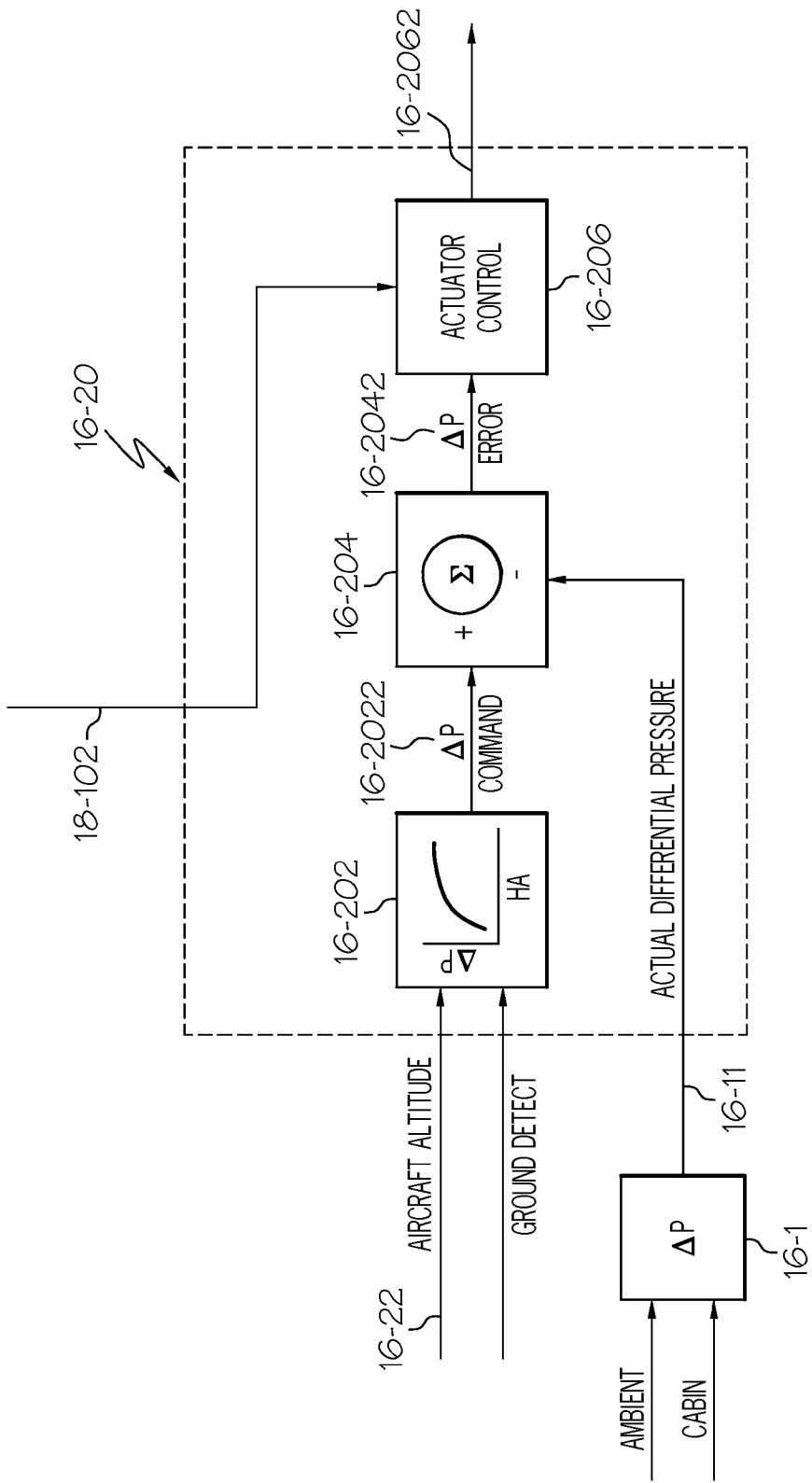
FIG. 6 is a block diagram of a central processing unit (CPU) for the pressure relief valve control unit in accordance with an embodiment of the present invention.

Referring now to FIG. 6 and back to FIG. 4 and FIG. 5, it may be seen how one or more of the actuators 18-4 and/or 18-6 may be controlled to provide desired pressure relief protection for the aircraft 10. The PRVC 16 may be provided a central processing unit (CPU) 16-20. The signals 16-11 and 16-22 may be provided as inputs to the CPU 16-20. The pressure signals may be electrical signals representing pneumatic values. The differential pressure sensor 16-1 may be a pneumatic differential pressure sensor that is in communication with actual cabin pressure and ambient pressure and may incorporate electronic circuitry (not shown) which may produce electrical signals that represent actual differential pressure or actual ambient pressure. It is important to note that the electrical signals used to represent cabin pressure or ambient pressure as an inputs to the CPU 16-20 must be produced independently from the outflow valve control sub-system 12, so that failure of any input to or function of the outflow valve control sub-system 12 may not affect proper operation of the differential pressure sensor 16-1.

The CPU 16-20 may comprise a function generator 16-202 which may produce a ΔP command signal 16-2022 that may vary as a function of altitude of the aircraft 10. However, irrespective of actual altitude, the ΔP command signal 16-2022 may be produced as a zero signal upon receipt of a signal from a ground detection sensor 25 of FIG. 5. A summer 16-204 may combine the signals 16-11 and 16-2022 to produce a ΔP error signal 16-2042. The ΔP error signal 16-2042 may be employed as an input signal to an actuator controller 16-206 which may provide operation signals 16-2062 to the motor drive circuit 16-14 of FIG. 5 to control operation of the actuators 18-4 and/or 18-6. The actuator controller 16-206 may also be provided with an end-of-travel signal 18-102 produced by the end-of-travel detector 18-10 of FIG. 4. The actuator controller 16-206 may contain within it a compensator, as is known in the art, to compute the actuator operation signals 16-2062 from the ΔP error signal 16-2042. The actuator controller 16-206 may use the ΔP error signal 16-2042 within a proportional or proportional-integral compensator to produce the actuator operation signals 16-2062. In an exemplary embodiment where a brushed direct current motor is used, the actuator operation signals 16-2062 may comprise an open or a closed signal carrying a PWM signal. The pressure relief valve 18-2 may be responsive to the actuator operation signals 16-2062 so that its butterfly plate 18-22 position is servo controlled. Servo control of the butterfly plate 18-22 position may control air exhaust from, or into, the aircraft 10 to limit and regulate the ΔP. The function generator 16-202 may be programmed with a stepped limit program to produce the ΔP command signal 16-2022 in a format such as that illustrated in FIG. 2 by the graph lines 204 and 206. Alternatively the function generator 16-202 may be programmed so that the ΔP limit command signal 16-2022 may closely track the desired ΔP 202 that would be maintained by a properly functioning one of the cabin pressure outflow valve control sub-systems 12. As illustrated in FIG. 3, the signal 16-2022, represented by the graph line 304, may be produced so that it exceeds, by a predetermined amount, the desired ΔP 202.

It should be noted that while FIGS. 2 and 3 may illustrate ΔP limits for positive pressure differentials, it is also possible to program the function generator 16-202 so that negative pressure differentials may be controlled within desired limits by the cabin pressure relief sub-system 14. In other words, the cabin pressure relief sub-system 14 may be employed to replace a conventional negative pressure relief valve on the aircraft 10.

Under normal operating conditions of the aircraft 10, i.e., when the cabin pressure outflow valve control sub-system 12 is functioning properly, the ΔP error signal 16-2042 may be zero. In that case, the valve 18-2 of FIG. 4 may remain closed. Whenever actual ΔP 16-11 may differ from the desired ΔP 202 by an amount greater than a predetermined margin, the ΔP error signal 16-2042 may no longer remain zero. When the ΔP error signal 16-2042 is not zero, the actuator control 16-206 may produce actuator operating signals 16-2062 to drive either or both of the actuators 18-4 and/or 18-6.

In a case of excessive positive actual ΔP 16-11, the actuator 18-4 may rotate the butterfly plate 18-22 to allow air flow to the outside of the aircraft 10. After the actual ΔP 16-11 may reach a level that is not excessively positive, the actuator 18-4 may rotate the butterfly plate 18-22 to a closed position so that air flow through the valve 18 is stopped. Over time, while the ΔP error signal 16-2042 is not zero, and the actual ΔP 16-11 is greater than the desired ΔP 202, but less than the ΔP limit 204, 206, or 304 (of FIGS. 2 and 3), the actuator 18-4 may rotate the butterfly plate 18-22 to a multitude of intermediate positions responsive to actuator operating signals 16-2062. Thus, the ΔP may be regulated to within the safety limits of the aircraft structure.

In the case of negative actual ΔP 16-11, the actuator 18-4 may rotate the butterfly plate 18-22 to allow air flow to the inside of the aircraft 10.

The actuator 18-4 may function as a primary actuator. The actuator 18-6 may be controlled as a secondary actuator. As a secondary actuator, the actuator 18-6 may serve as a redundant actuator that may rotate the butterfly plate 18-22 in the event of failure of the primary actuator 18-4 or failure of the PRVC 16 function that provides the actuator operating signals 16-2062 or in the event that the PRVC 16 commands the actuator 18-6 open or closed for periodic test purposes. In either case, the gearbox 18-8 may be adapted to transmit torque from both of the actuators 18-4 and 18-6 to the butterfly plate 18-22. The secondary actuator 18-6 may operate to close the valve 18 as needed even if the primary actuator 18-4 fails to perform that role.

Figure 7:
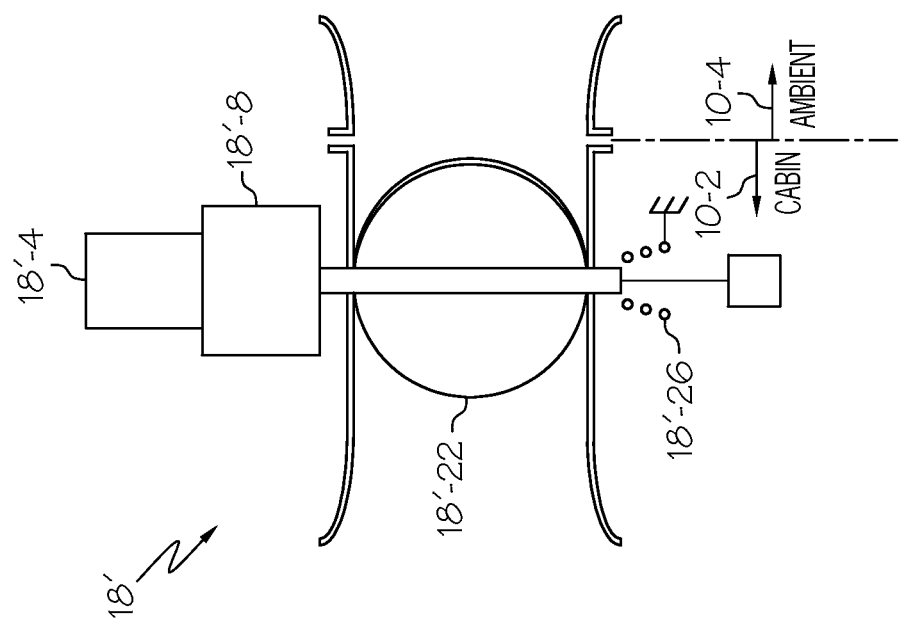
FIG. 7 is a cross-sectional view of a single-actuator pressure relief valve in accordance with an embodiment of the present invention.

In an exemplary embodiment of the present invention, a valve assembly 18' may be configured as shown in FIG. 7. The valve assembly 18' may be provided with a single actuator 18'-4. The actuator 18'-4 may provide rotational torque to a butterfly plate 18'-22 through a high efficiency gearbox 18'-8. In the present invention the high efficiency gearbox 18'-8 may have a gear train efficiency greater than 75% so that when aircraft exhaust airflow passes through the valve 18, aerodynamic loads from the airflow may close the butterfly plate 18'-22 if an valve operating signal is removed from the actuator 18'-4. The butterfly plate 18'-22 may be attached to a spring return 18'-26. The spring return 18'-26 may be strong enough to close the valve 18' in the event of a loss of the valve operating signal 16-2062 from a PRVC 16' and when there is insufficient aerodynamic load to close the butterfly plate 18'-22.

Figure 8:
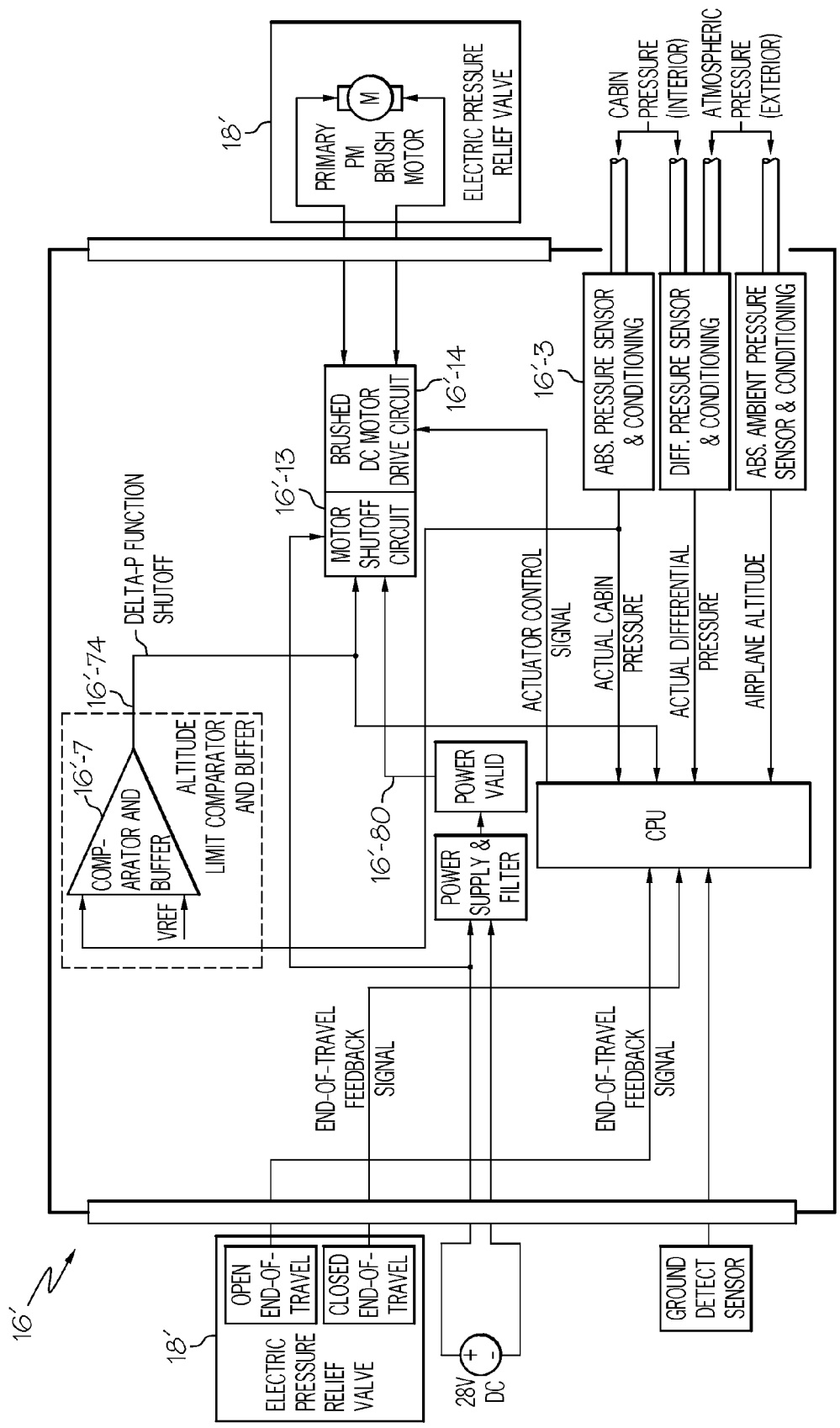
FIG. 8 is a detailed block diagram of a pressure relief system with a single actuator in accordance with an embodiment of the present invention.

Referring now to FIG. 8 a configuration of the PRVC 16' may be seen which may used in conjunction with the single-actuator valve 18'. The PRVC 16' may contain a cabin pressure sensor 16'-3 and a comparator 16'-7. A reference signal 16'-50 may be provided to the comparator 16'-7 The PRVC 16' may produce a Boolean true false 16'-74, in which a true one of the Boolean signals 16'-74 may indicate that the cabin pressure has decompressed beyond 15,000 ft. The Boolean true signal 16'-74 may be identified as the altitude limit signal 16'-74.

The PRVC 16', may also contain a primary motor shutoff circuit 16'-13 and a primary motor drive circuit 16'-14. The primary motor shutoff circuit 16'-13 may contain a function that may disable the ability of the primary motor driver circuit 16'-14 when the altitude limit signal 16'-74 is present. It can also be understood that the primary motor shutoff circuit 16'-13 may contain other inputs that might also lead to a disablement of the primary motor driver circuit 16'-14 (e.g., an invalid power input signal 16'-80).

Thus, it may be seen if the cabin pressure is detected to be decompressed above a cabin altitude of 15,000 ft, the altitude limit signal 16'-74 may disable the primary motor driver circuit 16'-14 using the primary motor shutoff circuit 16'-13 so that the primary actuator 18'-4 may no longer operate valve 18'. Further it may be seen that if the primary motor shutoff circuit 16'-13 disables control of valve 18' then the valve closing spring 18'-26 may close valve 18' using both the spring 18'-26 closing force and, if present, aerodynamic load. In this way it may be seen that valve 18', may not cause a decompression to the aircraft 10 due to an erroneous open command to the valve 18' that may result from a control failure.

Figure 9:
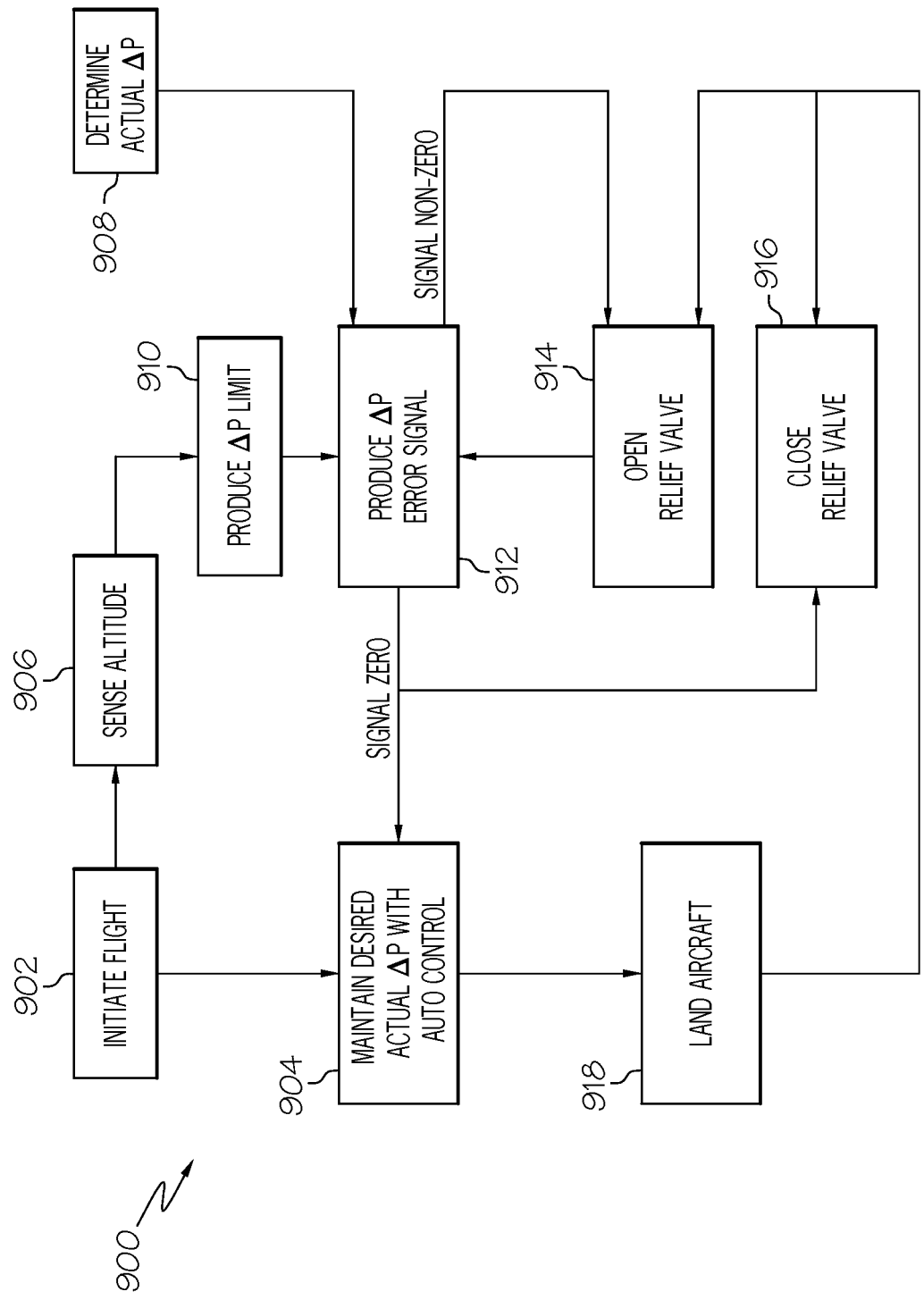
FIG. 9 is a flow chart of a method for controlling aircraft cabin pressure in accordance with an embodiment of the present invention.

In one embodiment of the present invention, a method is provided for maintaining a desired cabin pressure in an aircraft (e.g. the aircraft 10). In that regard the method may be understood by referring to FIG. 9. In FIG. 9, a flow chart may portray various aspects of a method 900. In a step 902, aircraft flight may be initiated. In a step 904, desired cabin pressure may be maintained (e.g., by operation of the cabin pressure outflow valve control sub-system 12).

In a step 906, altitude of the aircraft may be sensed (e.g. with the signal 16-22). In a step 908, actual cabin-to-ambient pressure differential may be determined (e.g., by operation of the sensor 16-1). In a step 910, a ΔP limit command may be produced (e.g., by comparing the altitude signal 16-22 with a parametrical relationship programmed into the function generator 16-202 to produce the signal 16-2022. The parametrical relationship may be similar to that represented by the graph 304 of FIG. 3). In a step 912, a ΔP error signal may be produced (e.g., the ΔP error signal may be produced by summing the signal 16-2022 and the signal 16-11).

In the event that the ΔP error signal is zero, cabin pressure may continue being maintained by operation of the step 904 (e.g. through continued operation of the cabin pressure outflow valve control sub-system 12). In the event that the ΔP error signal is non-zero, a pressure relief valve may be opened and servo controlled in a step 914 (e.g., the actuator control 16-206 may command operation of the actuator 18-4 and/or 18-6 to rotate the butterfly plate 18-22 to allow air flow through the valve 18-2). In a step 916, the relief valve may close responsively to attainment of a zero level for the ΔP error signal (e.g., the actuator 18-4 and/or the actuator 18-6 may be commanded to close the valve 18-2).

In a step 918, the aircraft may be landed. After landing, step 914 may be initiated, followed by step 916 and then followed by step 914. In this manner the relief valve may be tested for proper operational condition after each flight of the aircraft 10.

It should be understood, of course, that the foregoing relates to exemplary embodiments of the invention and that modifications may be made without departing from the spirit and scope of the invention as set forth in the following claims.

We claim:

1. A cabin pressure control system in an aircraft, comprising:
   a cabin pressure outflow valve control sub-system configured to control outflow valves of the aircraft; and
   a cabin pressure relief sub-system configured to operate independently of and simultaneously with the cabin pressure outflow valve control sub-system, including:
   a pressure relief valve with a closure member;
   an actuator for the closure member;
   a pressure relief valve control unit configured to produce command signals to open or close the pressure relief valve;
   a function generator operable simultaneously with but independently from the cabin pressure outflow valve control sub-system and programmed with a desired parametric relationship among parameters: aircraft altitude; desired cabin-to-ambient pressure differential (desired $\Delta P$); and a predetermined limit of variation between desired $\Delta P$ and actual cabin-to-ambient pressure differential (actual $\Delta P$);

the function generator adapted to produce cabin-to-ambient pressure differential ($\Delta P$) command signals based on a state of the parameters, the $\Delta P$ command signals produced independently from any command signals produced by the cabin pressure outflow valve sub-system; and the actuator being adapted to rotate responsively to the $\Delta P$ command signals and actual $\Delta P$ to open the closure member of the pressure relief valve as needed to reduce excessive variations between actual $\Delta P$ and desired $\Delta P$.

2. The cabin pressure control system of claim 1 wherein both positive and negative variations between actual $\Delta P$ and desired $\Delta P$ are reduced.

3. The cabin pressure control system of claim 1:
wherein the closure member is rotatable; and
wherein the actuator for the closure member is a rotary actuator.

4. The cabin pressure control system of claim 3 further comprising:
a second actuator; and
a gearbox through which rotational torque from both actuators is transmitted to the closure member.

5. The cabin pressure control system of claim 3 wherein the closure member is a butterfly plate.

6. The cabin pressure control system of claim 3 wherein the closure member is held in a closed position by torsional spring force in an absence of rotational torque from the rotary actuator.

7. The cabin pressure control system of claim 1:
wherein the pressure relief valve comprises bell-shaped openings at opposite ends of a valve body;
wherein a first one of the bell-shaped openings is positioned to accelerate air flowing into the aircraft; and
wherein a second one of the bell-shaped openings is positioned to accelerate air flowing out of the aircraft.

8. The cabin pressure control system of claim 1:
wherein the function generator is adapted to produce zero $\Delta P$ command signals when the aircraft is determined to be at ground level, irrespective of actual altitude of the aircraft at ground level.

9. The cabin pressure control system of claim 1, wherein the cabin pressure relief sub-system is configured to control the actual $\Delta P$ via release of air from the aircraft during a malfunction of the cabin pressure outflow valve control sub-system.

* * * * *